United States Patent
Sugimoto et al.

(10) Patent No.: US 9,769,328 B2
(45) Date of Patent: Sep. 19, 2017

(54) DETERMINING WHEN REFRAIN FROM PERFORMING IMAGE QUALITY ADJUSTMENT BY AN IMAGE QUALITY CONTROL AND ADJUSTMENT APPARATUS, AN IMAGE QUALITY CONTROL AND ADJUSTMENT METHOD, AND A NON-TRANSITORY COMPUTER READABLE MEDIUM

(71) Applicant: FUJI XEROX CO., LTD., Tokyo (JP)

(72) Inventors: Shuichi Sugimoto, Kanagawa (JP); Kenji Mori, Kanagawa (JP); Jun Koyatsu, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/003,394

(22) Filed: Jan. 21, 2016

(65) Prior Publication Data
US 2017/0078496 A1 Mar. 16, 2017

(30) Foreign Application Priority Data
Sep. 10, 2015 (JP) .................................. 2015-178337

(51) Int. Cl.
*H04N 1/00* (2006.01)
*H04N 1/60* (2006.01)
(Continued)

(52) U.S. Cl.
CPC ....... *H04N 1/00023* (2013.01); *G06F 3/1204* (2013.01); *G06F 3/1208* (2013.01); *G06F 3/1253* (2013.01); *G06F 3/1255* (2013.01); *G06F 3/1256* (2013.01); *G06K 15/027* (2013.01); *G06K 15/1878* (2013.01); *H04N 1/00029* (2013.01); *H04N 1/00034* (2013.01); *H04N 1/00045* (2013.01); *H04N 1/00058* (2013.01); *H04N 1/00076* (2013.01); *H04N 1/00082* (2013.01); *H04N 1/00411* (2013.01); *H04N 1/00477* (2013.01);
(Continued)

(58) Field of Classification Search
None
See application file for complete search history.

(56) References Cited

U.S. PATENT DOCUMENTS 7,898,704 B2 * 3/2011 Doi ...................... H04N 1/6033
358/1.9
8,547,611 B2 * 10/2013 Ohkawa ............. H04N 1/00002
358/1.9
(Continued)

FOREIGN PATENT DOCUMENTS

JP 2002-199145 A 7/2002

*Primary Examiner* — Scott A Rogers
(74) *Attorney, Agent, or Firm* — Sughrue Mion, PLLC

(57) ABSTRACT

An image quality control and adjustment apparatus includes a management unit and a controller. The management unit manages operation specification information. The controller performs, in a case where an operation that conforms to the operation specification information is performed, an image quality adjustment for an image forming apparatus using a result obtained from the operation, and does not perform, in a case where an operation that does not conform to the operation specification information is performed, an image quality adjustment for the image forming apparatus using a result obtained from the operation.

18 Claims, 8 Drawing Sheets

(51) Int. Cl.
*H04N 1/23* (2006.01)
*G06K 15/02* (2006.01)
*G06F 3/12* (2006.01)

(52) U.S. Cl.
CPC ......... *H04N 1/2315* (2013.01); *H04N 1/2338* (2013.01); *H04N 1/2353* (2013.01); *H04N 1/2392* (2013.01); *H04N 1/6033* (2013.01); *H04N 1/00482* (2013.01); *H04N 2201/0094* (2013.01)

(56) References Cited

U.S. PATENT DOCUMENTS

| | | | |
|---|---|---|---|
| 9,137,423 B2* | 9/2015 | Miyamoto | H04N 1/60 |
| 9,473,660 B2* | 10/2016 | Mori | H04N 1/00915 |
| 2016/0352976 A1* | 12/2016 | Kuroiwa | H04N 1/6027 |

* cited by examiner

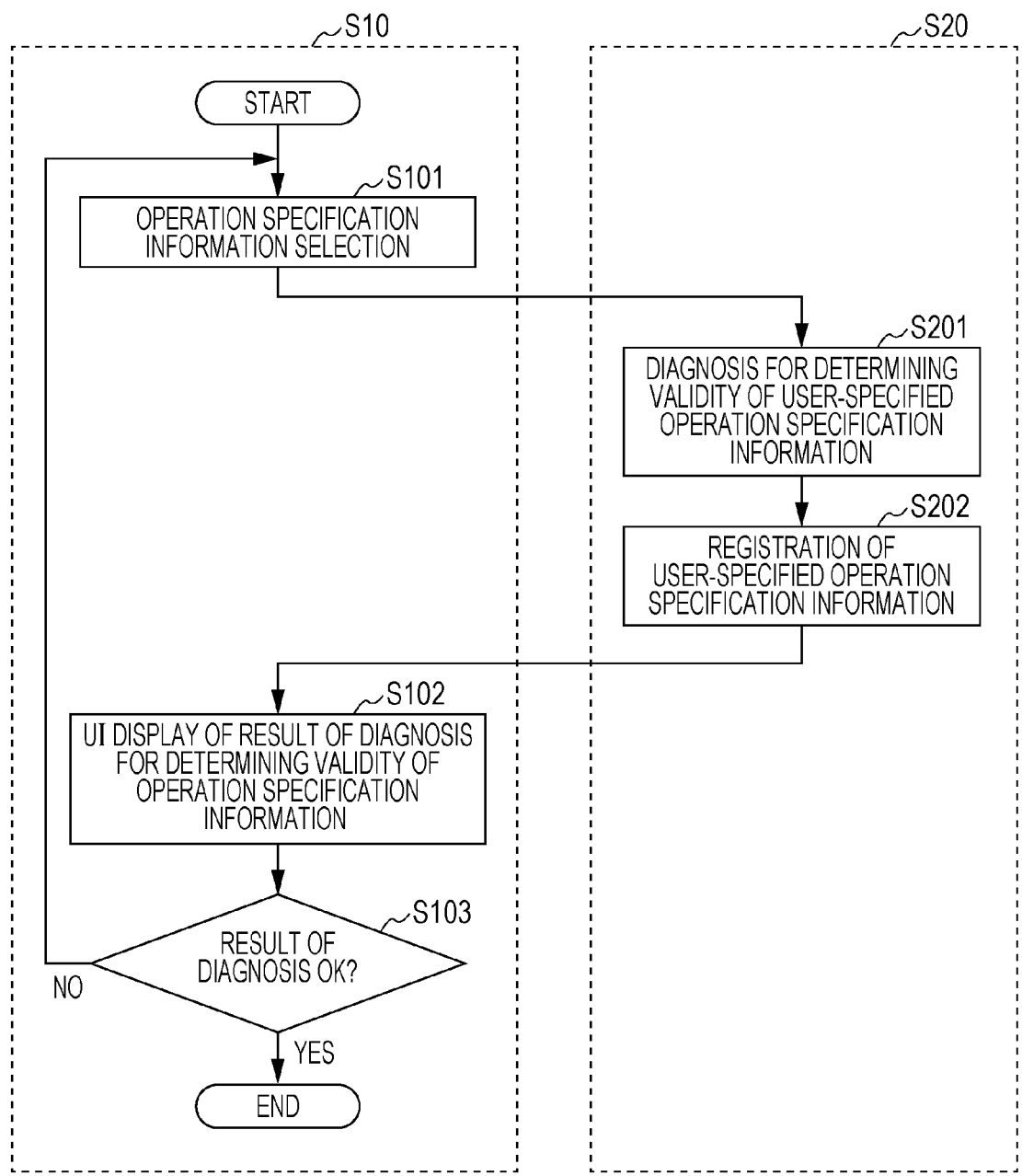

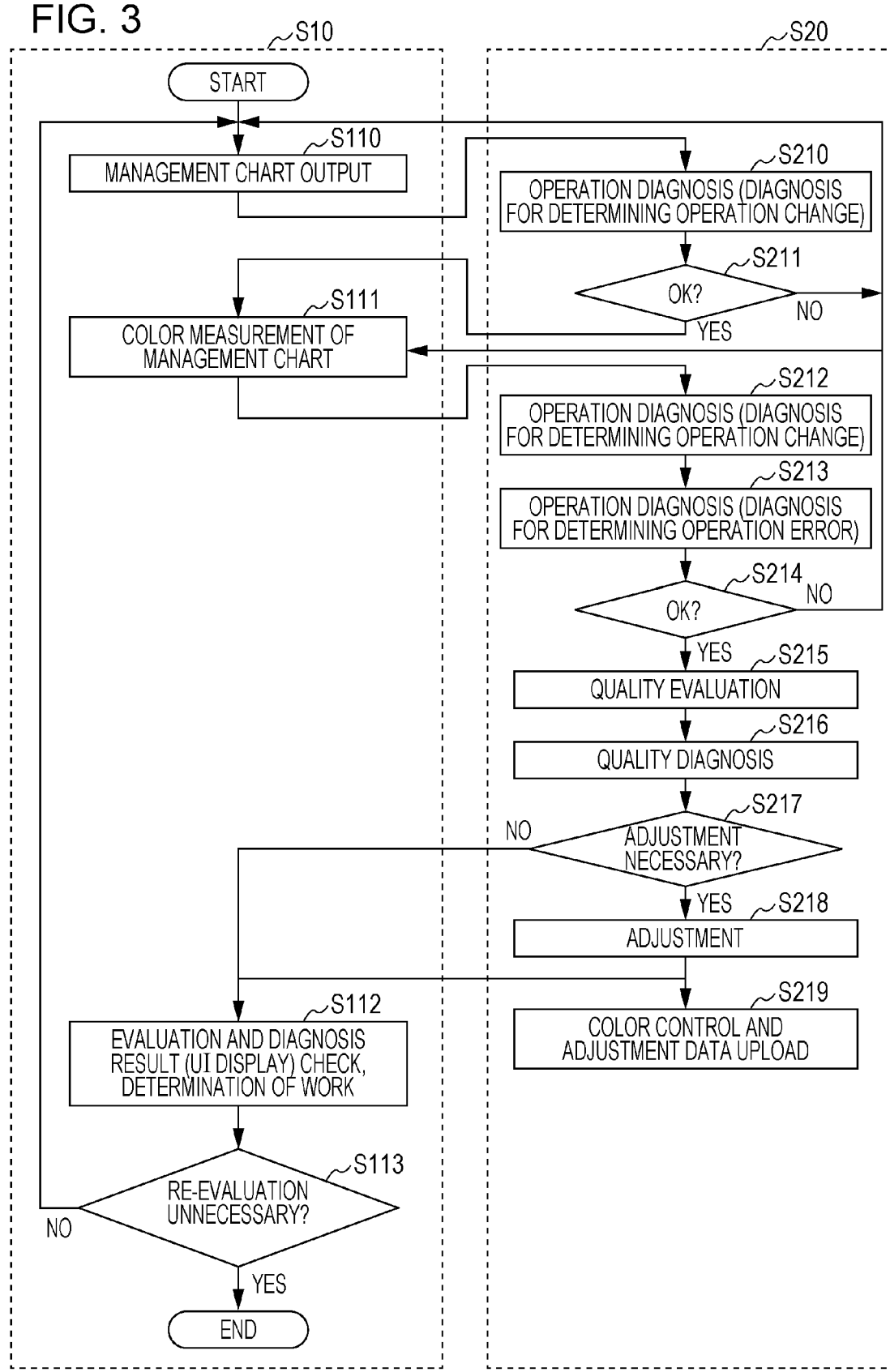

FIG. 4

| MAJOR CATEGORY | MINOR CATEGORY | EXAMPLE OF OPTION |
|---|---|---|
| COLOR TARGETS | CALIBRATION TARGET | COATED PAPER STANDARD |
| | PRINT TARGET | JC2011 COATED |
| MEASUREMENT CONDITIONS | SCAN PROFILE | NO |
| | TYPE OF COLOR MEASURING DEVICE | i1Pro |
| | COLOR MEASURING DEVICE | 11111 |
| | MEASUREMENT LIGHT SOURCE | D50 |
| | OBSERVATION CONDITION | 2° |
| | NEUTRAL DENSITY FILTER | STATUS A |
| | UV CUT FILTER | NO |
| | SCAN DIRECTION | NO |
| PAPER | TYPE OF PAPER | AURORA COAT |
| IMAGE PROCESSING APPARATUS SETTINGS | INFORMATION ABOUT CONNECTED IMAGE PROCESSING APPARATUS | COMPANY'S OWN SERVER |
| | PAPER SETTING | COATED PAPER 81-105 GSM |
| | SCREEN | STANDARD |
| | COLOR CONVERSION PROFILE | COATED STANDARD |
| | PROFILE CREATION CONDITION | K SATURATED COLOR REPRODUCTION ASSURANCE: YES |
| | TOTAL VOLUME LIMITATION | 300% |
| | DENSITY ADJUSTMENT CURVE | NO |
| IMAGE FORMING APPARATUS SETTINGS | INFORMATION ABOUT OUTPUT MACHINE MODEL | COMPANY'S OWN IMAGE FORMING APPARATUS 1 |
| | TARGET VALUE OF TONE OF IMAGE FORMING APPARATUS | STANDARD |
| | TARGET VALUE OF TONER DENSITY OF IMAGE FORMING APPARATUS | STANDARD |
| | TRAY USED | HCF1 |
| | SECONDARY TRANSFER OUTPUT VALUE OF IMAGE FORMING APPARATUS | STANDARD |
| | PAPER SETTING | COATED PAPER 81-105 GSM |
| MANAGEMENT CHART | TYPE OF COLOR MEASUREMENT PATCH | FOR i1Pro |
| | NUMBER OF COLOR MEASUREMENT PATCHES | STANDARD |

FIG. 5

| MAJOR CATEGORY | MINOR CATEGORY | DETECTED DATA |
|---|---|---|
| COLOR TARGETS | CALIBRATION TARGET | NAME OF CALIBRATION TARGET DATA |
| | PRINT TARGET | NAME OF PRINT TARGET DATA |
| MEASUREMENT CONDITIONS | SCAN PROFILE | NAME OF SCAN PROFILE |
| | TYPE OF COLOR MEASURING DEVICE | INFORMATION ABOUT TYPE OF COLOR MEASURING DEVICE INDICATED BY COLOR MEASUREMENT DATA |
| | COLOR MEASURING DEVICE | SERIAL NUMBER OF COLOR MEASURING DEVICE INDICATED BY COLOR MEASUREMENT DATA |
| | MEASUREMENT LIGHT SOURCE | INFORMATION ABOUT MEASUREMENT LIGHT SOURCE INDICATED BY COLOR MEASUREMENT DATA |
| | OBSERVATION CONDITION | INFORMATION ABOUT OBSERVATION CONDITION INDICATED BY COLOR MEASUREMENT DATA |
| | NEUTRAL DENSITY FILTER | INFORMATION ABOUT NEUTRAL DENSITY FILTER INDICATED BY COLOR MEASUREMENT DATA |
| | UV CUT FILTER | INFORMATION ABOUT UV CUT FILTER INDICATED BY COLOR MEASUREMENT DATA |
| | SCAN DIRECTION | SCAN DIRECTION INDICATED BY COLOR MEASUREMENT DATA |
| PAPER | TYPE OF PAPER | PAPER WHITENESS COLOR MEASUREMENT VALUE |
| IMAGE PROCESSING APPARATUS SETTINGS | INFORMATION ABOUT CONNECTED IMAGE PROCESSING APPARATUS | DFE INFORMATION TRANSFERRED FROM IMAGE PROCESSING APPARATUS |
| | PAPER SETTING | OUTPUT SETTING INFORMATION TRANSFERRED FROM IMAGE PROCESSING APPARATUS |
| | SCREEN | OUTPUT SETTING INFORMATION TRANSFERRED FROM IMAGE PROCESSING APPARATUS |
| | COLOR CONVERSION PROFILE | OUTPUT SETTING INFORMATION TRANSFERRED FROM IMAGE PROCESSING APPARATUS |
| | PROFILE CREATION CONDITION | OUTPUT SETTING INFORMATION TRANSFERRED FROM IMAGE PROCESSING APPARATUS |
| | TOTAL VOLUME LIMITATION | OUTPUT SETTING INFORMATION TRANSFERRED FROM IMAGE PROCESSING APPARATUS |
| | DENSITY ADJUSTMENT CURVE | OUTPUT SETTING INFORMATION TRANSFERRED FROM IMAGE PROCESSING APPARATUS |
| IMAGE FORMING APPARATUS SETTINGS | INFORMATION ABOUT OUTPUT MACHINE MODEL | INFORMATION ABOUT OUTPUT MACHINE TRANSFERRED FROM IMAGE FORMING APPARATUS |
| | TARGET VALUE OF TONE OF IMAGE FORMING APPARATUS | OUTPUT SETTING INFORMATION TRANSFERRED FROM IMAGE FORMING APPARATUS |
| | TARGET VALUE OF TONER DENSITY OF IMAGE FORMING APPARATUS | OUTPUT SETTING INFORMATION TRANSFERRED FROM IMAGE FORMING APPARATUS |
| | TRAY USED | OUTPUT SETTING INFORMATION TRANSFERRED FROM IMAGE FORMING APPARATUS |
| | SECONDARY TRANSFER OUTPUT VALUE OF IMAGE FORMING APPARATUS | OUTPUT SETTING INFORMATION TRANSFERRED FROM IMAGE FORMING APPARATUS |
| | PAPER SETTING | OUTPUT SETTING INFORMATION TRANSFERRED FROM IMAGE FORMING APPARATUS |
| MANAGEMENT CHART | TYPE OF COLOR MEASUREMENT PATCH | INFORMATION ABOUT OUTPUT CHART TYPE TRANSFERRED FROM IMAGE PROCESSING APPARATUS |
| | NUMBER OF COLOR MEASUREMENT PATCHES | INFORMATION ABOUT NUMBER OF PATCHES INDICATED BY COLOR MEASUREMENT DATA |

DETERMINING WHEN REFRAIN FROM PERFORMING IMAGE QUALITY ADJUSTMENT BY AN IMAGE QUALITY CONTROL AND ADJUSTMENT APPARATUS, AN IMAGE QUALITY CONTROL AND ADJUSTMENT METHOD, AND A NON-TRANSITORY COMPUTER READABLE MEDIUM

CROSS-REFERENCE TO RELATED APPLICATIONS

This application is based on and claims priority under 35 USC 119 from Japanese Patent Application No. 2015-178337 filed Sep. 10, 2015.

BACKGROUND (i) Technical Field

The present invention relates to an image quality control and adjustment apparatus, an image quality control and adjustment method, and a non-transitory computer readable medium.

(ii) Related Art

There has been an increased need for image quality control in image forming apparatuses, such as printers, and image quality control and adjustment apparatuses that assist image quality control have been proposed. Typical image quality control and adjustment apparatuses often output charts for image quality control, and evaluate, diagnose, and adjust the image quality automatically or remotely to thereby assist control.

SUMMARY

According to an aspect of the invention, there is provided an image quality control and adjustment apparatus including a management unit and a controller. The management unit manages operation specification information. The controller performs, in a case where an operation that conforms to the operation specification information is performed, an image quality adjustment for an image forming apparatus using a result obtained from the operation, and does not perform, in a case where an operation that does not conform to the operation specification information is performed, an image quality adjustment for the image forming apparatus using a result obtained from the operation.

BRIEF DESCRIPTION OF THE DRAWINGS

An exemplary embodiment of the present invention will be described in detail based on the following figures, wherein:

FIG. 2 is a first flowchart of a process in the exemplary embodiment;

FIG. 3 is a second flowchart of a process in the exemplary embodiment;

FIG. 4 is a diagram for describing operation specification information;

FIG. 5 is a diagram for describing detected data in an actual operation;

DETAILED DESCRIPTION

Figure 1:
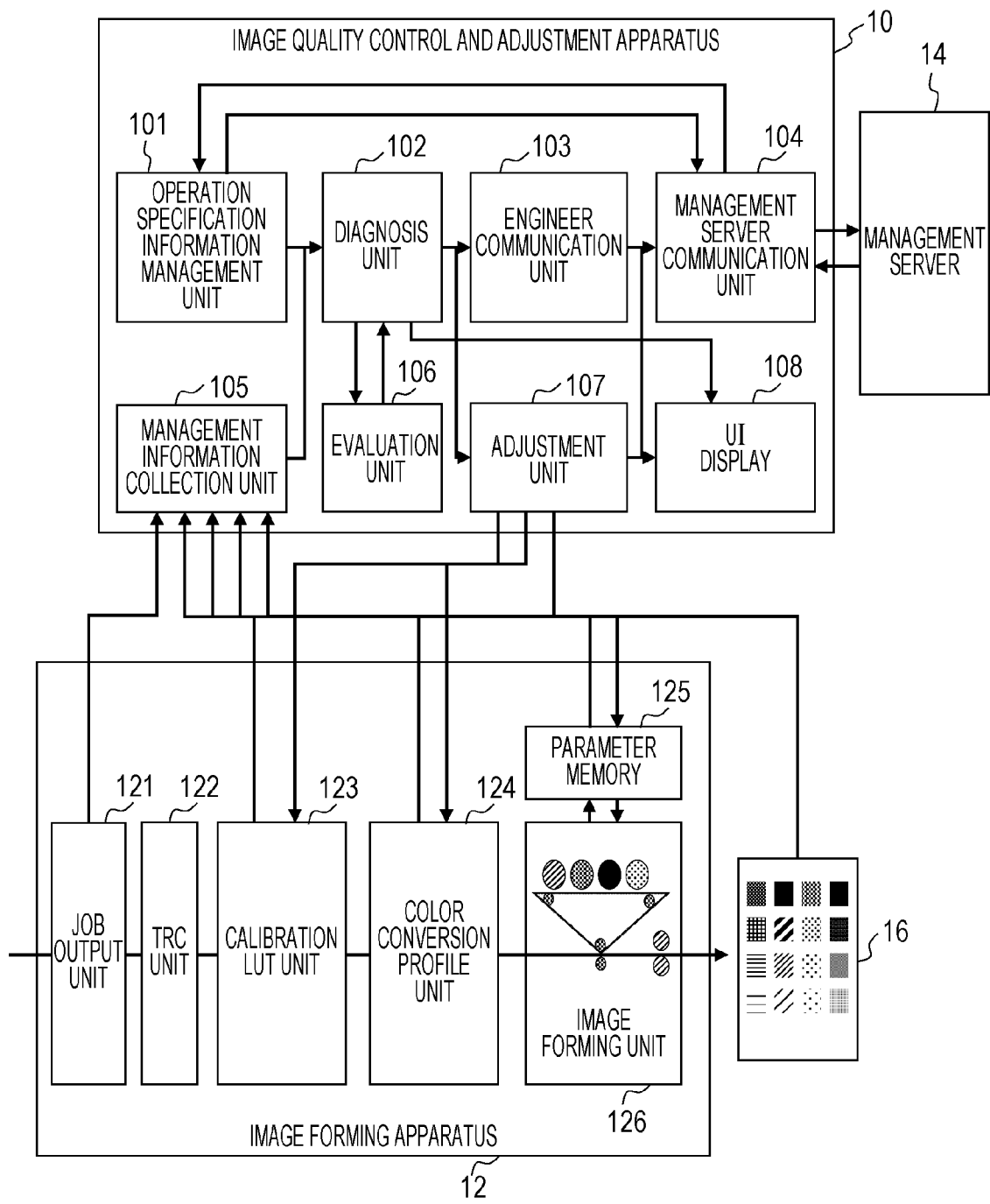
FIG. 1 is a block diagram illustrating a system of an exemplary embodiment.

Hereinafter, an exemplary embodiment of the present invention will be described with reference to the drawings.

Basic Principle

First, the basic principle of this exemplary embodiment is described.

In this exemplary embodiment, a user of an image forming apparatus creates optimum operation information that corresponds to the environment and registers the operation information in an image quality control and adjustment apparatus as operation specification information in advance. The operation specification information may be defined as information that includes the specifics of items that may affect image quality. There are plural items that may affect image quality. In this exemplary embodiment described below, color targets, measurement conditions, paper, setting conditions of the image forming apparatus, and conditions of a management chart are assumed to be examples of the items; however, the items are not necessarily limited to these.

When image quality control and adjustment for the image forming apparatus is performed, the actual operation at the image quality control and adjustment apparatus is checked against the operation specification information registered in advance to thereby determine whether the actual operation conforms to the registered operation specification information. If the actual operation does not conform to the registered operation specification information, changes, and departs from the operation specification information, it is determined that a color measurement result from the operation is less reliable, and image quality control and adjustment using the color measurement result is not performed. On the other hand, if the actual operation conforms to the registered operation specification information, image quality control and adjustment is performed on the basis of the color measurement result from the operation.

As described above, in this exemplary embodiment, it is determined whether an operation performed by the user is valid or not, and image quality control and adjustment is performed only in a case where the operation is valid to thereby suppress incorrect image quality control and adjustment due to a human error by the user, a change in paper, or the like and suppress an increase in wasteful work hours caused by a change in the operation.

A change in the actual operation or a departure from the operation specification information, in other words, a variation in the operation, has a certain degree, and there may be a case where a large number of items change and a case where a small number of items change. The items that constitute the operation specification information may include items that have a relatively substantial impact on image quality and items that only have a relatively little impact on image quality. Accordingly, it is possible to finely control performing or non-performing of image quality control and adjustment in accordance with the degree of a change in the operation or an item that changes in the operation. Here, "non-performing" in this exemplary embodiment includes a case where image quality control and adjustment is not performed at all, a case where the content of any item that changes from the correct operation specification information is displayed via a user interface (UI) and an instruction is given so as to conform to the correct operation specification information, and a case where the operation is automatically corrected so as to conform to the correct specifications.

Next, a configuration and a process in this exemplary embodiment are described specifically.

Configuration

FIG. 1 is a block diagram illustrating a system of this exemplary embodiment. The system includes an image quality control and adjustment apparatus 10, an image forming apparatus 12, and a management server 14.

The image quality control and adjustment apparatus 10 is specifically constituted by a computer that is connected to the image forming apparatus 12, and includes an operation specification information management unit 101, a diagnosis unit 102, an engineer communication unit 103, a management server communication unit 104, a management information collection unit 105, an evaluation unit 106, an adjustment unit 107, and a UI display 108.

The operation specification information management unit 101 manages operation information that is specified by a user (customer) of the image forming apparatus 12 and that is used in a case of printing using the image forming apparatus 12. The operation specification information is transmitted to the management server 14 via the management server communication unit 104 and stored in the management server 14.

The diagnosis unit 102 diagnoses the operation specification information by determining whether the operation information managed by the operation specification information management unit 101 is valid on the basis of certain criteria. The diagnosis unit 102 performs a diagnosis to determine whether an operation that departs from the operation specifications is performed at the image forming apparatus 12 by using management information collected by the management information collection unit 105. The result of the diagnosis is output to the adjustment unit 107 and the UI display 108, and the UI display 108 displays the result of the diagnosis to thereby notify the user of the result.

The engineer communication unit 103 is operated by an engineer who administers the image forming apparatus 12, and transmits/receives data to/from the management server communication unit 104.

The management information collection unit 105 collects management information from each unit of the image forming apparatus 12. The management information includes the result of color measurement of a management chart 16 output from the image forming apparatus 12.

The evaluation unit 106 evaluates the management information about the image forming apparatus 12 fed from the diagnosis unit 102 and outputs the result of evaluation to the diagnosis unit 102. The diagnosis unit 102 outputs the result of evaluation to the adjustment unit 107.

The adjustment unit 107 adjusts each unit of the image forming apparatus 12 by using the result of diagnosis and evaluation from the diagnosis unit 102.

Specifically, the operation specification information management unit 101 is constituted by a memory, and the diagnosis unit 102, the management information collection unit 105, the evaluation unit 106, and the adjustment unit 107 are constituted by a controller, such as a central processing unit (CPU). The CPU reads processing programs stored in a program memory and executes the programs one by one to thereby perform management information collection, evaluation, diagnosis, and adjustment processing.

In this exemplary embodiment, the term "evaluation" means to quantize a degree to which the image quality reaches a target, the term "diagnosis" means to determine a reason for a difference between the target value of image quality and an evaluation result, and the term "adjustment" means to take measures for removing the difference between the target value of image quality and the evaluation result.

The image forming apparatus 12 is a printer, a multifunction machine, or the like and includes a job output unit 121, a tone reproduction curve (TRC) unit 122, a calibration lookup table (LUT) unit 123, a color conversion profile unit 124, a parameter memory 125, and an image forming unit 126. The job output unit 121, the TRC unit 122, the calibration LUT unit 123, and the color conversion profile unit 124 may constitute an image processing apparatus that is separated from the image forming apparatus 12.

The job output unit 121 outputs a print job that is input.

The TRC unit 122 and the calibration LUT unit 123 reproduce a desired tone property for the image forming unit 126. In a case of correcting the tone property, values in a calibration table stored in the calibration LUT unit 123 are corrected.

The color conversion profile unit 124 performs color conversion on a raster image in accordance with profile data. The profile data is data that includes information indicating associations between color coordinates of each grid point in an input-side color space and color coordinates in an output-side color space that correspond to the grid point. The profile data may be an International Color Consortium (ICC) profile or a profile based on a specific standard defined by the manufacturer of the image forming apparatus 12, for example. The output-side color space is the color space of the image forming unit 126 and is typically represented by a combination of four colors of cyan (C), magenta (M), yellow (Y), and black (K). However, the number of colors is not limited to four.

The parameter memory 125 stores various parameters of the image forming unit 126.

The image forming unit 126 performs printing by using data from the color conversion profile unit 124. Printed matter includes the management chart 16, and the image forming unit 126 prints and outputs the management chart 16 at a predetermined timing in a case of image quality control and adjustment under control of a controller not illustrated.

In this exemplary embodiment, in the image quality control and adjustment apparatus 10, operation specification information for the image forming apparatus 12 is registered, a diagnosis is performed to determine whether an operation that conforms to the operation specification information is being performed, by using management information collected from the image forming apparatus 12, and evaluation, diagnosis, and adjustment are performed as usual in a case where an operation that conforms to the operation specification information is being performed to thereby control the image quality. On the other hand, in a case where it is determined that an operation that does not conform to the operation specification information is being performed as a result of the diagnosis, the user is notified of the operation not conforming to the operation specification information and is urged to perform an operation that conforms to the correct operation specification information.

Operation Specification Information

Operation specification information in this exemplary embodiment is information about the specifics of items that affect image quality, such as paper and a color measuring device used in color control, various output settings, and so on. In operation specification information, optimum options are selected for each user (customer) in accordance with the user environment. For example, operation specification information specifically includes items of:

color targets;
  calibration target;
  print target;
measurement conditions;
  scan profile;
  type of color measuring device;
  color measuring device;
  measurement light source;
  observation condition;
  neutral density filter;
  ultraviolet (UV) cut filter;
  scan direction;
paper;
  type of paper;
image processing apparatus settings;
  information about connected image processing apparatus;
  paper setting;
  screen;
  color conversion profile;
  profile creation condition;
  total volume limitation;
  density adjustment curve;
image forming apparatus settings;
  information about output machine model;
  target value of tone of image forming apparatus;
  target value of toner density of image forming apparatus;
  tray used;
  secondary transfer output value of image forming apparatus;
  paper setting;
management chart;
  type of color measurement patch; and
  number of color measurement patches.

The user creates operation specification information by selecting a desired option from among plural options for each item in the operation specification information. For example, a user makes a selection from among standard, custom 1, and custom 2 as the scan profile, makes a selection from among 11111, 22222, and 33333 as the color measuring device, makes a selection from among yes and no as the UV cut filter, makes a selection from among vertical and horizontal as the scan direction, makes a selection from among AURORA COAT, U-LITE, and OK PRINCE HIGH-QUALITY as the type of paper, and makes a selection from among non-coated standard and coated standard as the color conversion profile.

However, the time taken from paper output to color measurement, the operator, the place of installation, and so on are not registered as operation specification information, because these items are not considered as items that may directly affect image quality.

Processes

FIG. 2 is a flowchart of a process in this exemplary embodiment and specifically is a flowchart of a process of registering operation specification information. In FIG. 2, S10 includes part of the process performed by a user (customer), and S20 includes part of the process performed by the image quality control and adjustment apparatus 10.

First, a user selects a desired one from among plural options for each item in operation specification information described above (step S101). Operation specification information thus selected is fed to the diagnosis unit 102 of the image quality control and adjustment apparatus 10.

The diagnosis unit 102 performs a diagnosis to determine whether the operation specification information specified by the user is valid (step S201). Usually, in a case where the user specifies operation specification information by selection from among options, the operation specification information is determined to be valid as a result of the diagnosis. However, a specific combination might not be valid in some cases, such as a case where a combination of the paper, the color measuring device, and the type of color measurement patch or the number of color measurement patches might not be valid, for example. If the operation specification information is determined to be valid as a result of the diagnosis, the operation specification information is registered in the operation specification information management unit 101 of the image quality control and adjustment apparatus 10 (step S202).

The result of the diagnosis for determining the validity of the operation specification information is displayed on the UI display 108 to thereby notify the user of the result (step S102). If the result of the diagnosis is OK (Yes in step S103), that is, if the operation specification information is valid, the process ends. If the result of the diagnosis is NG (No in step S103), that is, if the operation specification information is not valid, the user makes selections for operation specification information again (step S101). The process described above is repeated until operation specification information is determined to be valid as a result of the diagnosis.

FIG. 3 is a flowchart of a process in this exemplary embodiment and specifically is a flowchart of a management process.

First, the user makes the image forming apparatus 12 output the management chart 16 (step S110).

In response to this, the diagnosis unit 102 of the image quality control and adjustment apparatus 10 collects management information, performs an operation diagnosis (step S210), and determines whether a change has occurred in the operation with reference to the operation specification information (step S211). If the user outputs the management chart 16 in accordance with the operation specification information, there is no problem. However, in a case where "for i1Pro" is specified as the type of color measurement patch and "large number" is specified as the number of color measurement patches in the operation specification information for the management chart while "for scanner" is specified as the type of color measurement patch and "small number" is specified as the number of color measurement patches for the actual management chart, it is determined as a result of the diagnosis that a change has occurred in the operation. In this case, the determination in step S211 results in NG, and the user repeats the process in step S110 again.

If the determination in step S211 results in OK, that is, if the management chart 16 is output in accordance with the operation specification information, the user performs color measurement on the management chart 16 by using a color measuring device (step S111).

In response to this, the diagnosis unit 102 of the image quality control and adjustment apparatus 10 collects management information, performs an operation diagnosis (step S212), and determines whether a change has occurred in the operation with reference to the operation specification information and whether an operation error has occurred (step S213). If color measurement is performed in accordance with the operation specification information, there is no problem. In a case where the type of color measurement device differs from that specified in the operation specification information or in a case where the color measurement light source or the filter is different from that specified in the operation specification information, the operation departs from the operation specification information. The departure from the operation specification information may be determined to be an operation error. In this case, output of the management chart or color measurement of the management chart is redone again (No in step S214). In this exemplary embodiment, as illustrated in steps S212 and S213, an operation change diagnosis is performed and an operation error diagnosis is further performed. However, only an operation change diagnosis may be performed, and only in a case where a change has occurred in the operation, evaluation, diagnosis, and adjustment may be controlled so as not to be performed.

In a case where a change has not occurred in the operation or in a case where a change has occurred in the operation, but the change is a slight change for image quality and is not regarded as an operation error (Yes in step S214), the evaluation unit 106 performs evaluation (step S215), and the diagnosis unit 102 performs a diagnosis using the result of evaluation (step S216). That is, the result of color measurement using the color measuring device is evaluated, and a diagnosis is performed to determine on the basis of the result of evaluation whether a desired color is obtained. As a result of the diagnosis by the diagnosis unit 102, if it is determined that an adjustment is not necessary (No in step S217), the result of the diagnosis is displayed on the UI display 108 to thereby notify the user of the result (step S112). If re-evaluation is necessary (No in step S113), the process in step S110 and the subsequent steps is repeated. If re-evaluation is unnecessary (Yes in step S113), the process ends.

On the other hand, if it is determined that an adjustment is necessary as a result of the diagnosis (Yes in step S217), the adjustment unit 107 adjusts values in tables in the calibration LUT unit 123 or the like of the image forming apparatus 12 (step S218) and uploads color control and adjustment data to the management server 14 via the management server communication unit 104 (step S219).

FIG. 4 illustrates an example of selection of operation specification information performed in step S101 of FIG. 2. For each item of operation specification information, the user selects one from among plural options. For example, the user selects "coated paper standard" as the calibration target, "11111" as the color measuring device, "no" as the UV cut filter, "for i1Pro" as the type of color measurement patch of the management chart, and "standard" as the number of color measurement patches. The operation specification information thus selected is registered in the operation specification information management unit 101 after a diagnosis for determining the validity of the operation specification information has been performed.

FIG. 5 illustrates an example of management information that is detected and collected by the management information collection unit 105 and that corresponds to the operation specification information. For example, the name of calibration target data is detected as the calibration target, the serial number of a color measuring device indicated by color measurement data is detected as the color measuring device, information about a UV cut filter indicated by color measurement data is detected as the UV cut filter, information about the type of output chart transferred from the image processing apparatus is detected as the type of color measurement patch of the management chart, and information about the number of patches indicated by color measurement data is detected as the number of color measurement patches. The diagnosis unit 102 checks such detected data against the operation specification information registered in the operation specification information management unit 101 and performs a diagnosis to determine whether the detected data is different from the operation specification information and whether an error has been made in the operation.

Figure 6A:
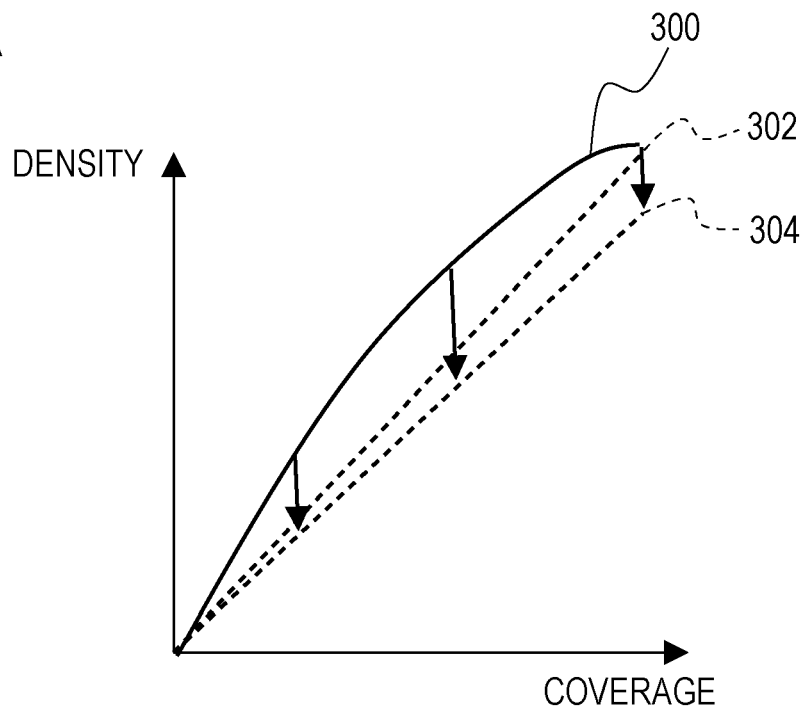
FIGS. 6A and 6B are first diagrams for describing color correction.
Figure 6B:
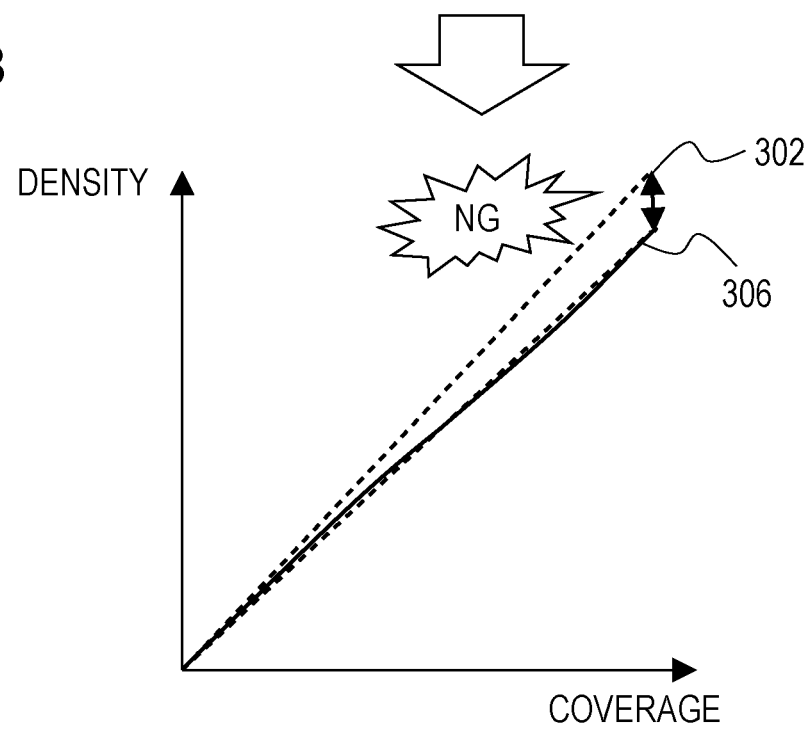

FIGS. 6A and 6B illustrate a specific example of an operation error made by the user and specifically illustrate a case where the user uses a target value different from a correct target value when creating a color correction parameter. In FIG. 6A, the graph 300 represents an obtained tone property, the graph 302 represents the correct target value that is to be used, and the graph 304 represents the target value that is erroneously used this time. In the case where such an incorrect target value is used, the tone property is corrected so as to match the incorrect target value 304 as illustrated in FIG. 6B (the result of correction is represented by the graph 306), resulting in a color that is different from an intended color.

On the other hand, in this exemplary embodiment, a calibration target is included as operation specification information, and a calibration target specified in advance by a user is registered in the operation specification information management unit 101. Accordingly, if the user uses a calibration target different from the calibration target specified in the operation specification information, the diagnosis unit 102 detects the change in the operation and sends to the user a notification for redoing. As a result, it is possible to suppress color correction that is erroneously performed as illustrated in FIG. 6B. Consequently, according to this exemplary embodiment, it is possible to evaluate, diagnose, and adjust color correction on the basis of a correct operation while suppressing an erroneous operation.

Figure 7A:
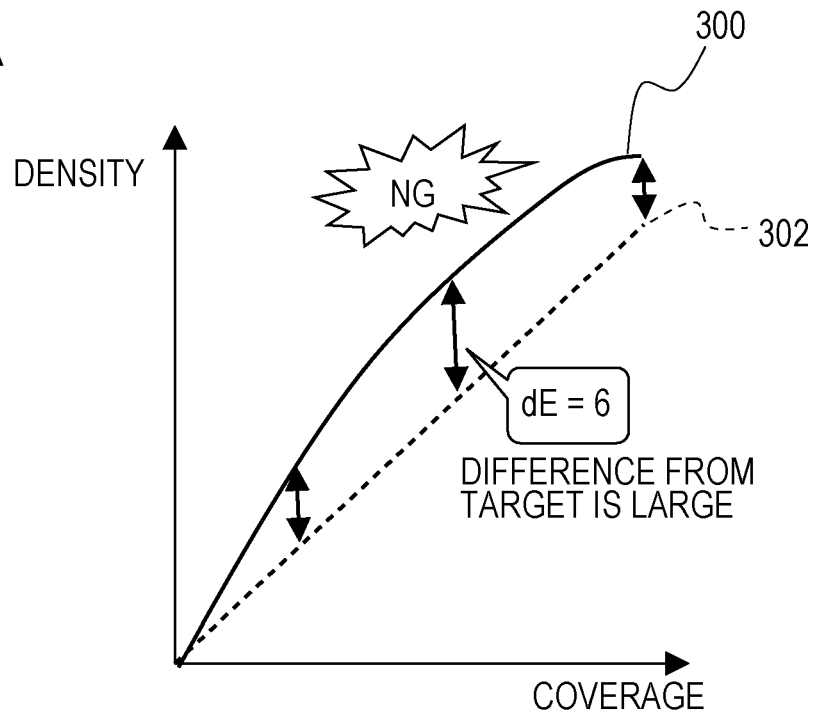
FIGS. 7A and 7B are second diagrams for describing color correction.
Figure 7B:
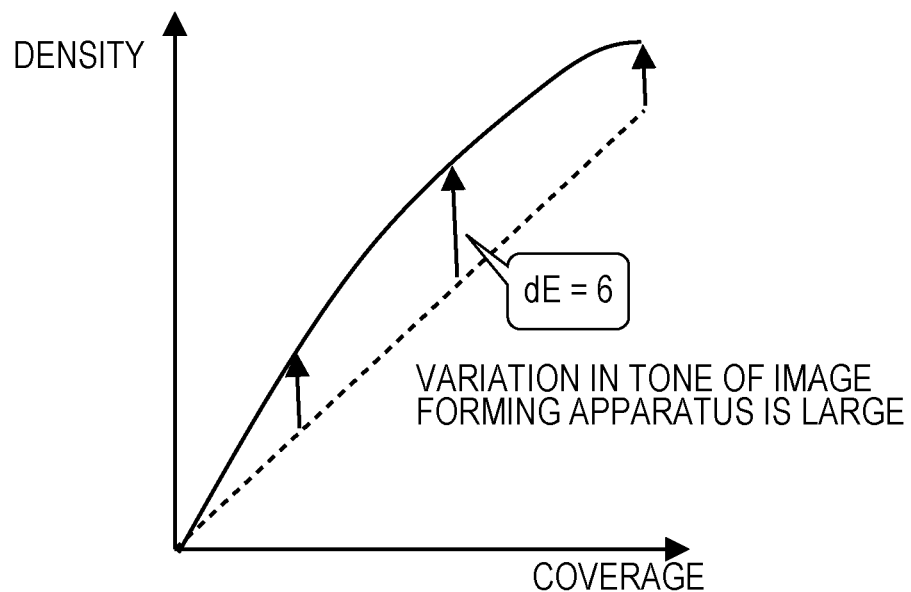

FIGS. 7A, 7B, 8A, and 8B illustrate an example of evaluating, diagnosing, and adjusting color correction. FIG. 7A illustrates an evaluation performed by the evaluation unit 106 in which the evaluation unit 106 compares the graph 300 that represents an obtained tone property with the target value 302 and evaluates the difference dE as "6", for example. FIG. 7B illustrates a diagnosis performed by the diagnosis unit 102 in which the diagnosis unit 102 determines as a result of the diagnosis that the difference between the obtained tone property 300 and the target value 302 is equal to or larger than a threshold and is large, that the variation in the tone property of the image forming apparatus 12 is large, and that an adjustment is necessary on the basis of the result of the evaluation by the evaluation unit 106.

Figure 8A:
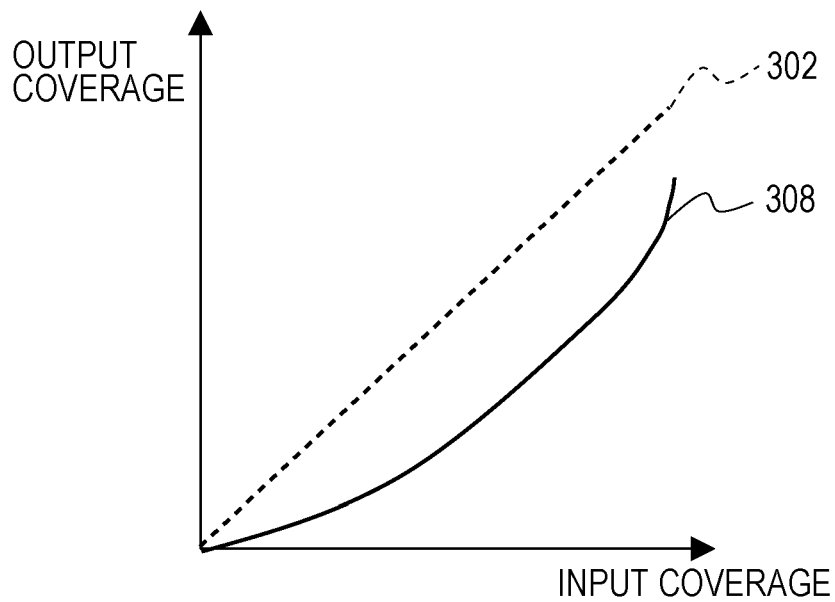
FIGS. 8A and 8B are third diagrams for describing color correction.
Figure 8B:
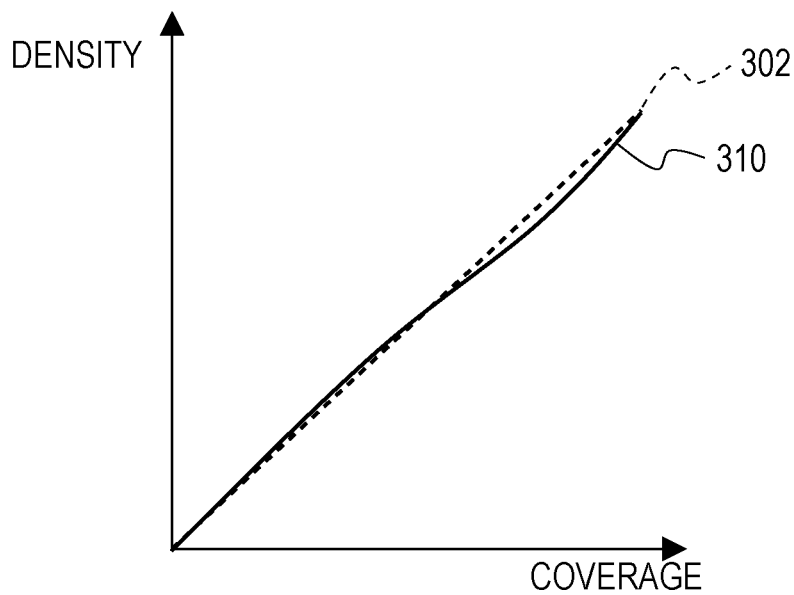

FIGS. 8A and 8B illustrate an adjustment performed by the adjustment unit 107. FIG. 8A illustrates a color correction parameter calculated on the basis of the result of the evaluation by the evaluation unit 106, the color correction parameter being represented by the graph 308. FIG. 8B illustrates the adjustment result 310 obtained by using the color correction parameter. The adjustment result 310 closely matches the target value 302, which indicates that the adjustment has been correctly performed.

Although an exemplary embodiment of the present invention has been described, exemplary embodiments of the present invention are not limited to this, and various modifications may be made.

For example, in this exemplary embodiment, in a case where a management unit that automatically manages and registers color correction work data is provided, determination as to whether color correction work data is to be managed and registered may be determined on the basis of the result of a diagnosis by the diagnosis unit 102. In a case where an operation that does not conform to the operation specification information is performed, color correction work data is not managed or registered to thereby simplify management.

Although the diagnosis unit 102, the evaluation unit 106, and the adjustment unit 107 are separately provided as illustrated in FIG. 1 in this exemplary embodiment, the evaluation process, diagnosis process, and adjustment process are a series of processes, and therefore, these processes may be performed by a single control module.

In this exemplary embodiment, the user creates operation specification information by selecting and specifying items in the operation specification information and registers the operation specification information in the operation specification information management unit 101; however, the user may create operation specification information on the basis of fixed input information that is input in a fixed manner without options, and register the operation specification information in the operation specification information management unit 101 to thereby simplify registration of operation specification information.

Alternatively, in a case where operation specification information has been created for another image forming apparatus, the operation specification information may be registered as is in the operation specification information management unit 101 or may be quoted and modified as appropriate and registered in the operation specification information management unit 101 to thereby also simplify registration. In a case of quoting operation specification information for another image forming apparatus, it is desired that a test chart is output from the image forming apparatus 12 and the resulting output test chart is verified before quoting the operation specification information.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image quality control and adjustment apparatus comprising:
   at least one hardware processor configured to implement:
   a management unit that manages operation specification information; and
   a controller that determines whether to perform an image quality adjustment by determining whether user input parameters of an operation match parameters of the operation specification information predetermined before performing the operation, and the controller further:
   in a first case where the operation is performed and the controller determines that the user input parameters of the operation match parameters of the operation specification information, performs an image quality adjustment for an image forming apparatus using a first result obtained from a first performance of the operation, and
   in a second case where the operation is performed and the controller determines that the user input parameters of the operation do not match the parameters of the operation specification information, determines to refrain from performing the image quality adjustment for the image forming apparatus using a second result obtained from a second performance of the operation.

2. The image quality control and adjustment apparatus according to claim 1, wherein
   the operation specification information includes at least any of a target color value, a color measuring device type, a color measurement condition, a paper type, and an output condition upon printing.

3. The image quality control and adjustment apparatus according to claim 1, wherein
   the image quality adjustment includes an evaluation of the first result obtained from the performance of the operation, and
   the controller refrains from performing the evaluation in the second case.

4. The image quality control and adjustment apparatus according to claim 2, wherein
   the image quality adjustment includes an evaluation of the first result obtained from the operation, and
   the controller refrains from performing the evaluation in the second case.

5. The image quality control and adjustment apparatus according to claim 1, wherein
   the image quality adjustment includes a diagnosis of the first result obtained from the operation, and
   the controller refrains from performing the diagnosis in the second case.

6. The image quality control and adjustment apparatus according to claim 2, wherein
   the image quality adjustment includes a diagnosis of the first result obtained from the operation, and
   the controller refrains from performing the diagnosis in the second case.

7. The image quality control and adjustment apparatus according to claim 1, wherein
   the controller determines whether the operation in the first case is performed at least at any of a timing of outputting a management chart of the image forming apparatus and a timing of performing color measurement on the management chart.

8. The image quality control and adjustment apparatus according to claim 2, wherein
   the controller determines whether the operation in the first case is performed at least at any of a timing of outputting a management chart of the image forming apparatus and a timing of performing color measurement on the management chart.

9. The image quality control and adjustment apparatus according to claim 3, wherein
   the controller determines whether the operation in the first case is performed at least at any of a timing of outputting a management chart of the image forming apparatus and a timing of performing color measurement on the management chart.

10. The image quality control and adjustment apparatus according to claim 4, wherein
    the controller determines whether the operation in the first case is performed at least at any of a timing of outputting a management chart of the image forming apparatus and a timing of performing color measurement on the management chart.

11. The image quality control and adjustment apparatus according to claim 5, wherein the controller determines whether the operation in the first case is performed at least at any of a timing of outputting a management chart of the image forming apparatus and a timing of performing color measurement on the management chart.

12. The image quality control and adjustment apparatus according to claim 6, wherein
the controller determines whether the operation in the first case is performed at least at any of a timing of outputting a management chart of the image forming apparatus and a timing of performing color measurement on the management chart.

13. The image quality control and adjustment apparatus according to claim 1, wherein the controller receives a user input of the user input parameters of the operation, and
the management unit stores the operation specification information in advance of the controller receiving the user input.

14. The image quality control and adjustment apparatus according to claim 13, wherein in the second case and in response to the controller determining to not perform the image quality adjustment, the controller further controls a display to display an indication that user input of the user input parameters of the operation does not match the parameters of the operation specification information.

15. The image quality control and adjustment apparatus according to claim 1, wherein the controller further determines whether the parameters of the operation specification information match the user input of the user input parameters of the operation in response to receiving the user input.

16. The image quality control and adjustment apparatus according to claim 1, wherein the parameters of the operation specification information comprise a type of color measurement patch and a number of color measurement patches.

17. An image quality control and adjustment method comprising:
storing operation specification information in a memory;
controlling determination whether to perform an image quality adjustment by determining whether user input parameters of an operation match parameters of the operation specification information predetermined before performing the operation;
performing, in a first case where the operation is performed and it is determined that the user input parameters of the operation match parameters of the operation specification information, the image quality adjustment for an image forming apparatus using a first result obtained from a first performance of the operation; and
determining, in a second case where the operation is performed and it is determined that the user input parameters of the operation do not match the parameters of the operation specification information, to refrain from performing the image quality adjustment for the image forming apparatus using a second result obtained from a second performance of the operation.

18. A non-transitory computer readable medium storing a program causing a computer to execute a process for image quality control and adjustment, the process comprising:
storing operation specification information in a memory;
controlling determination whether to perform an image quality adjustment by determining whether user input parameters of an operation match parameters of the operation specification information predetermined before performing the operation;
performing, in a first case where the operation is performed and it is determined that the user input parameters of the operation match parameters of the operation specification information, the image quality adjustment for an image forming apparatus using a first result obtained from a first performance of the operation; and
determining, in a second case where the operation is performed and it is determined that the user input parameters of the operation do not match the parameters of the operation specification information, to refrain from performing the image quality adjustment for the image forming apparatus using a second result obtained from a second performance of the operation.

* * * * *